SHIFT REGISTERS

Filed Dec. 2, 1959

INVENTOR
SAMMY A. BUTLER
BY [signature]
ATTORNEY

United States Patent Office 3,160,861

Patented Dec. 8, 1964

3,160,861

SHIFT REGISTERS

Sammy A. Butler, Peekskill, N.Y., assignor to International Business Machines Corporation, New York, N.Y., a corporation of New York Filed Dec. 2, 1959, Ser. No. 856,862
28 Claims. (Cl. 340—174)

This invention relates to switching circuits and more particularly to switching circuits employing Esaki diodes in combination wth magnetic cores.

An article in the Physical Review for January, 1958, on pages 603–604, entitled "New Phenomenon in Narrow Germanium P-N Junction," by Leo Esaki, describes a semi-conductor structure which has come to be known as an "Esaki Diode," sometimes alternately referred to as a "tunnel diode." As described by Esaki, this diode is a PN junction device in which the junction is very thin, i.e. narrow, in the currently accepted terminology (on the order of 150 Angstrom units or less), and in which the semiconductor materials on both sides of the junction, have high impurity concentrations (of the order of $10^{19}$ net donor or acceptor atoms per cubic centimeter for germanium).

The tunnel diode is characterized by a very low reverse impedance, approaching a short circuit, with a forward potential-current characteristic exhibiting a negative resistance region beginning at a small value of forward potential (on the order of 0.05 volt) and ending at a large forward potential (of the order of 0.2 volt). The potential value of the low potential end of the negative resistance region is very stable with respect to temperature and does not vary over a range of temperatures from a value near zero degrees K to several hundred degrees K. At potential values outside the limited range described above, forward resistance of the tunnel diode is positive. The tunnel diode may then be referred to as a diode exhibiting an "n" type characteristic curve for a plot of current versus potential. For a more complete understanding of the structure and operational characteristics of the tunnel diode, reference is made to an article appearing in the Proceedings of the IRE, July 1959, pages 1201–1206, entitled "Tunnel Diodes as High Frequency Devices," by H. S. Sommers, Jr.

For clarity, whenever a tunnel diode or Esaki is referred to in the specification and claims, what is meant is the type diode described above and unless otherwise specified is assumed to be operated in a circuit exhibiting a load characteristic which enables the diode to operate in at least one stable state. Where the tunnel diode is said to be operated in a first stable state characterized by a high current and low potential and/or a second stable state characterized by a low current and high potential, it is assumed that the first stable state lies at a point on a characteristic "n" type curve of the diode before the negative resistance region while the second stable state lies at a point beyond the negative resistance region of the diode, with the terms having a relative relationship to one another.

Because of the unique characteristics of the tunnel diode, it has been found, that shifting registers employing the combination of such diodes with magnetic cores may be constructed utilizing a minimum of components to achieve very high switching speeds.

More particularly, it has been found that by connecting a tunnel diode with a current source and providing a bistable magnetic core coupled to the diode, upon applying a signal to initiate switching of the core from one stable state to another, the associated diode is forced into a cycle of operation which provides current to completely switch the core, therefore acting similar to a blocking oscillator. It has also been found that if the tunnel diode is caused to operate in a first and a second stable state that if the core is switched from one stable state toward another, the diode is switched from one of its stable operating states to another. Conversely, if the diode is switched from one of its stable operating states to another, the core is switched from one stable state to another, thus there is seen to be a coaction between the two elements such that they are interdependently related. By utilizing these and other principles which will become clear in the subsequent detailed description, novel shifting registers may be fabricated both for unidirectional information flow and reversible information flow.

Accordingly a prime object of this invention is to provide novel circuits employing tunnel diodes in combination with magnetic cores.

A further object of this invention is to provide novel circuits employing tunnel diodes adapted to operate in a first and a second stable state and bistable magnetic cores so interconnected as to cause the stable states of the elements to be interdependently related.

Still another object of this invention is to provide a novel shift register.

Yet another object of this invention is to provide a novel reversible shift register.

The foregoing and other objects, features and advantages of the invention will be apparent from the following more particular description of preferred embodiments of the invention, as illustrated in the accompanying drawings.

Figures 1, 2, 4:
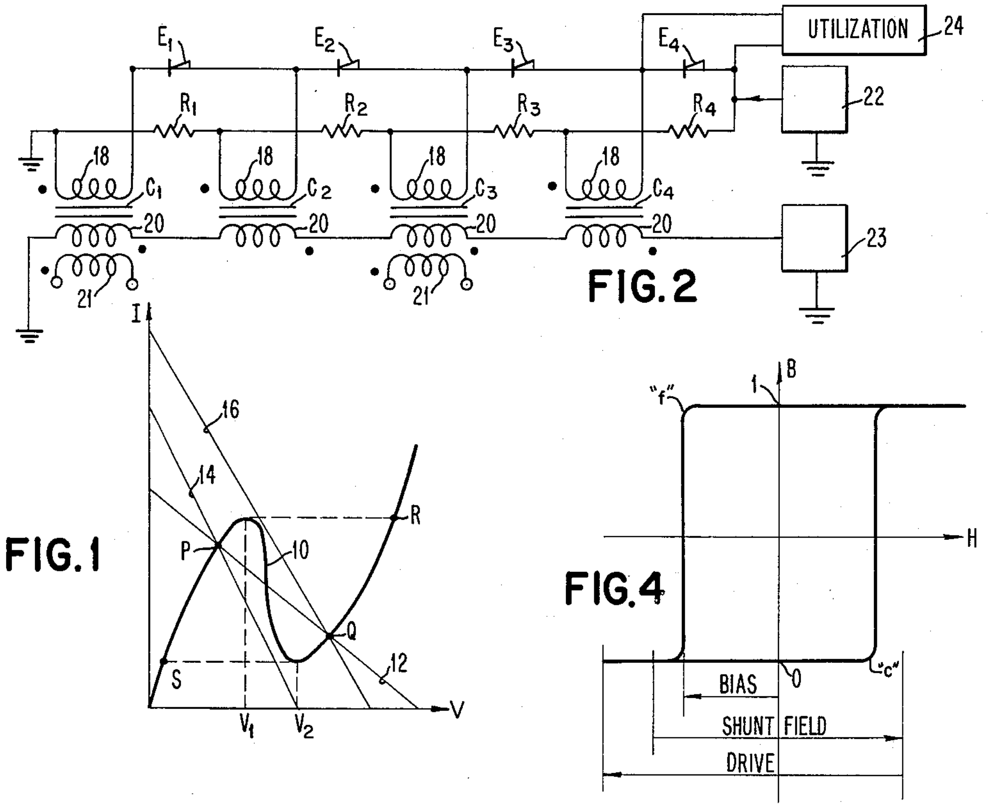
FIG. 1 is a plot of current (I) potential (V) for an "n" type characteristic diode herein employed.
FIG. 2 illustrates a shift register in accordance with this invention.
FIG. 4 illustrates characteristics of the type magnetic cores which may be employed in the circuits of the FIGS. 2 and 3.

Referring to the FIG. 1, a typical potential-current characteristic of a tunnel diode, taken at a particular temperature is shown by a curve 10. The curve 10 shows that in the reverse impedance region, the slope of the characteristic is steep, indicating that the resistance of the diode is very low, being practically a short circuit. In the positive potential, or forward conduction region, the characteristic has a positive resistance between zero and $V_1$, a negative resistance between potentials $V_1$ and $V_2$ and a positive resistance above $V_2$. The tunnel diode is very stable as to the $V_1$ potential value for a wide range of temperatures. The $V_2$ value may vary somewhat with temperature and the slopes of the various portions of the characteristic 10 vary with temperature, however the negative resistance region at potentials just higher than $V_1$ is retained at all temperatures below the temperature at which the material becomes effectively intrinsic.

With the use of a tunnel diode having the characteristic curve 10 in a circuit establishing a load line characteristic 12, the tunnel diode is then capable of operating in a first stable state P characterized by low voltage drop and high current and a second stable state Q characterized in a relatively high voltage drop with relatively small current flow. Other possible modes of operation herein contemplated is provision of a load line 14 which intersects the curve 10 at the point P only and provision of a load line 16 which intersects the curve 10 at the point Q only.

Referring to the FIG. 2, an embodiment of a shifting register according to this invention is shown employing a number of tunnel diodes $E_1$–$E_4$ and a number of magnetic cores $C_1$–$C_4$. Each magnetic core C has a control winding 18 and a shift winding 20 thereon, while the cores $C_1$ and $C_3$ are provided with an information input winding 21. The cores C may be in the shape of bars, cusps or toroids and made of material exhibiting substantially rectangular hysteresis characteristics with different stable states of remanent flux density. These different states are arbitrarily referred to as 1 and 0 in representing binary information. Each of the diodes E is serially connected with a control winding 18 on a particular core C and a resistor R is in parallel with each diode E and each control winding 18. A source of direct current 22 is connected with each of the parallel circuits. The shift winding 20 of each core C is serially connected with the shift winding 20 of each succeeding core to a pulse generator 23. Outputs from the register are obtained by connection of a utilization means 24 across the diode $E_4$.

A dot is shown adjacent one terminal of each winding shown to indicate the winding sense on each of the cores. A positive pulse directed into the undotted end of a winding causes the core to switch to the 1 state if previously in the 0 state while a positive pulse directed into the dotted end of a winding tends to switch the core into the 0 state.

Assume that the source 22 and resistor R are such that the tunnel diodes E each experience a load line characteristic 12 as shown in the FIG. 1. Further assume that each of the diodes $E_1$–$E_4$ is operating in the P stable state and that each of the cores C is at negative saturation or in the 0 stable state. If a current impulse is directed into the undotted end of the input winding 21 on the core $C_3$, the core $C_3$ is switched from negative toward positive saturation and in so doing induces a voltage on the control winding 18 of the core $C_3$ with the undotted end positive. The voltage induced on the control winding 18 of the core $C_3$ necessitates increased current flow through the diode $E_2$ since this parallel branch must balance the voltage drop across the winding 18. The diode $E_2$ then moves along its characteristic curve 10, as shown in the FIG. 1, from point P toward the right until the voltage $V_1$ is reached, whereupon it immediately jumps to an operating point R on the curve 10. From the point R the diode $E_2$ moves down the curve 10 toward the stable operating point Q and during this time the core $C_3$ is completely switched to the 1 state. Thus the circuit stabilizes with the diodes $E_1$, $E_3$ and $E_4$ operating in the P stable state while the diode $E_2$ operates in the Q stable state. The diode $E_3$ being in the P state allows a relatively larger current therethrough as compared with the diode $E_2$. Most of the current is then forced through the winding 18 on the core $C_3$ and is directed into the undotted end saturating the core $C_3$ in the 1 state. Upon actuation of the clock pulse source 23, a pulse is directed into the dotted end of each of the shift windings 20 tending to switch each of the cores C to the 0 state. The core $C_3$ is then switched from the saturated 1 state toward the 0 state. As the magnetization of the core $C_3$ is switched, a voltage is induced in the winding 18 of the core $C_3$ with the dotted end positive causing increased current flow through the diode $E_3$. Referring to the FIG. 1, the diode $E_3$ follows the curve 10 from point P and jumps to point R as indicated by a dashed line, to provide increased current therethrough; while the diode $E_2$ moves its operation from point Q along the lower portion of the curve and jumps to point S, as shown by a dashed line to provide decreased current therethrough. The diodes $E_2$ and $E_3$ then tend to establish themselves in the stable operating states P and Q respectively.

As the diode $E_3$ seeks its stable operating state Q, the current through the diode $E_4$, due to the diode $E_4$ operating in the state P, is forced into the path including the winding 18 on the core $C_4$. This current is directed into the undotted end of the winding 18 on the core $C_4$ and hence switches the core $C_4$ from the 0 to the 1 state of saturation. The core $C_4$ in switching induces a voltage on the shift winding 20, but the source 23 opens the circuit in which is the winding 20 and thus this induced voltage has no effect. The cores $C_1$, $C_2$ and $C_3$ are thus left in negative saturation while the core $C_4$ is left in positive saturation. The diodes $E_1$, $E_2$ and $E_4$ are left operating in the P stable state while the diode $E_3$ is left operating in the Q stable state. Information has thus been shifted to the right.

It should be noted that although the cores $C_1$–$C_4$ employed and described above have rectangular loop hysteresis characteristics, since there is always current flow through the control winding 18 of each core C in either one direction or another when adjacent stages are in opposite information states, saturable reactor type material is capable of working equally well, since information storage may then take place in the diodes E of the circuit.

In constructing the circuit of FIG. 2, under static conditions, each core C can drop only a fixed volt-time product and thereafter offer no impedance. Each diode-resistance pair can be considered separately. The two operating points, P and Q, are chosen near the knees of the curve 10 of FIG. 1 and a straight line drawn therethrough uniquely determines the value of resistance R and the total direct current bias to be supplied by the source 22. The bias is found at the intersection of the current axis and the load line. The reciprocal of the absolute value of the slope is then the resistance R. The difference in the value of current for points P and Q is the amount of current available to switch the cores C.

The circuit of FIG. 2 is also capable of operation when the diodes E are made to operate in only one stable state. For instance, consider the characteristic curve of FIG. 1 where the load line is drawn as shown by the line 14. The source 22 must then be made larger with a smaller magnitude for the resistor R in each diode-resistance pair. Assume that the cores C are made of square loop magnetic material and initially all the diodes $E_1$–$E_4$ in FIG. 2 are in the P state while all the cores C are in the 0 state except the core $C_2$ which is in the 1 state. Upon operation of the clock pulse source 23, a pulse is directed into the dotted end of the winding 20 on the core $C_2$ which initiates switching of the core from 1 toward 0 saturation. As the core $C_2$ switches, a voltage is induced in the winding 18 in the core $C_2$ with the dotted end positive requiring increased current flow through the diode $E_2$. The diode $E_2$ then operates to move its operating characteristic from stable state P to point R whereupon the pulse from the source 23 terminates. As the core $C_2$ reaches negative saturation there is a decreasing voltage induced on the winding 18 and the diode $E_2$ moves along the curve 10 in the FIG. 1 toward point Q. As the diode moves its operation toward point Q in the FIG. 1, since the diode $E_3$ is operating at point P, current is forced through the undotted end of the winding 18 on the core $C_3$ which starts switching the core $C_3$ from 0 saturation toward positive 1 saturation. As the core $C_3$ starts switching the winding 18 appears as a high impedance and holds the $E_2$ current above point Q until switching is completed. After the core $C_3$ is fully switched to the 1 state, winding 18 appears as a low impedance draining current from $E_2$ until the diode $E_2$ switches to point S. The circuit then relaxes and the diode $E_2$ is left in the P stable operating state. As will be noted in this embodiment, each of the diodes E return to the same stable operating state P, therefore the information must be stored in the cores C necessitating the use of rectangular loop magnetic material.

Two other modes of operation for the shift register circuit of FIG. 2 are possible. Both these modes involve providing operation of the diodes E in the high voltage stable state Q. If, in the FIG. 2, each diode E is provided with the load line characteristic 12 in the FIG. 1, then with each of the cores $C_1$, $C_3$ and $C_4$ being in the 0 stable state, except the core $C_2$ which is in the 1 stable state and each of the diodes $E_1$, $E_3$ and $E_4$ operating in the Q stable state except the diode $E_2$, which is operating in the P stable state, upon actuation of the source 23 which energizes the windings 20 on the cores $C_1$–$C_4$, the core $C_2$ is switched from the 1 toward the 0 state. The core $C_2$ in switching induces a voltage in the winding 18 with the dotted end positive causing increased current flow through the diode $E_2$ and decreased current flow through the diode $E_1$. The diode $E_1$ moves along its characteristic curve 10 from point Q to point S while the diode $E_2$ moves along the curve 10 from operating state P to R. The diode $E_1$ then moves toward operating state P while the diode $E_2$ moves toward operating state Q. During this transitional period, an increasing current flow into the undotted end of winding 18 on the core $C_1$ switches the core $C_1$ from the 0 state of saturation toward the 1 state of saturation. Thus information is transferred down the line with memory being performed by the diodes $E_1$–$E_4$. In this mode of operation, again the material of the cores C need only be of saturable reactor type but works equally well with square loop material.

If the diodes $E_1$–$E_4$ were provided with a load line characteristic 16 shown in the FIG. 1, then each of the cores C must be made of rectangular loop magnetic material. Assuming all the diodes $E_1$–$E_4$ as being in the Q operating state with the core $C_2$ in the 1 stable state of flux remanence, upon operation of the clock pulse source 23, the winding 20 of the core $C_2$ is energized to initiate resetting of the core $C_2$ from the 1 to the 0 state. The core $C_2$ in being reset, induces a voltage on the control winding 18 with the dotted end positive causing increased current flow through the diode $E_2$ and decreased current flow through the diode $E_1$. The diode $E_1$ moves its operating point from Q to S whereupon the pulse from the source 23 is terminated, while the diode $E_2$ moves from operating point Q toward R on the curve 10 of FIG. 1. As the diode $E_1$ moves toward point P, increased current flows therethrough and into the undotted end of the control winding 18 on the core $C_1$. Thus the core $C_1$ is switched from the 0 to the 1 stable state. As the core $C_1$ reaches saturation in the 1 stable state, the diode $E_1$ has moved through point P and to operating point R and now moves toward stable state Q. Thus, information is again moved down the line, with storage taking place in the cores $C_1$.

Figure 3:
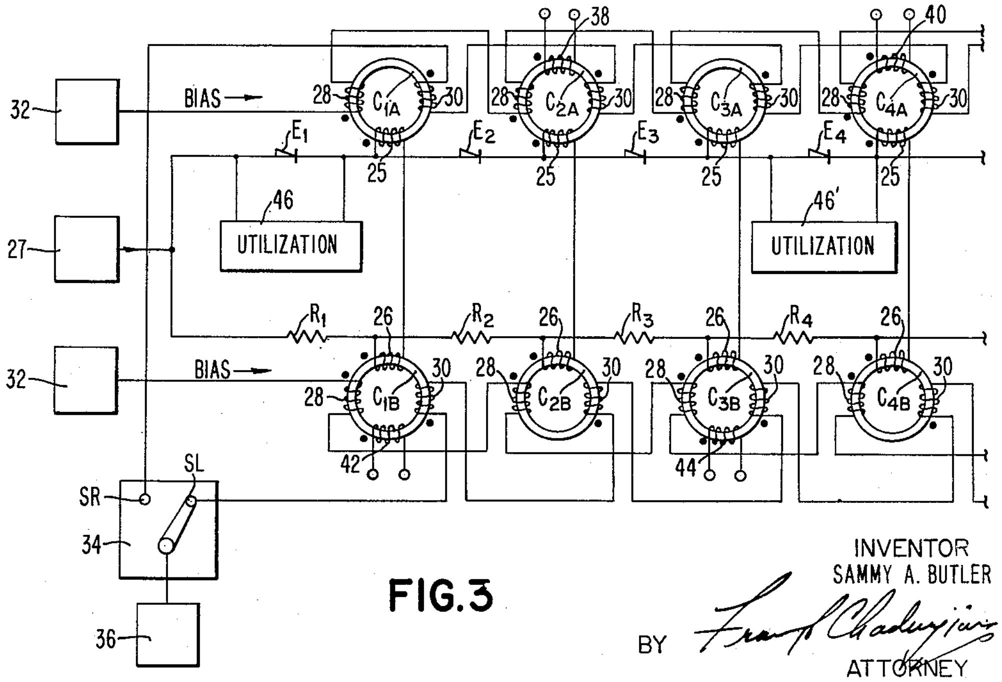
FIG. 3 illustrates a reversible shift register in accordance with this invention.

Employing the same basic principles of switching as utilized in the shifting register of FIG. 2, a reversible shifting register may be constructed as shown in the embodiment of FIG. 3. Referring to the FIG. 3, a plurality of cores $C_A$ are provided each having a control winding 25 thereon. A further plurality of cores $C_B$ are provided each having a control winding 26 thereon. The windings 25 are individually connected to the windings 26 serially opposed. Each of the windings 25 on the cores $C_A$ are connected through a diode E to a constant current source 27 while each of the windings 26 on the cores $C_B$ are connected through a resistor R to the source 27. Each core $C_A$ and $C_B$ is further provided with a bias winding 28 and a shift winding 30. The bias winding 28 on each core $C_A$ is serially connected to a direct current source 32, while similarly each of the bias windings 28 on the cores $C_B$ are serially connected to the source 32. The shift windings 30 on each of the cores $C_A$ are serially connected to a terminal SR, while the shift windings 30 on the cores $C_B$ are serially connected to a terminal SL. The terminals SR and SL make up two terminals of a switch 34 selectively operable to connect a clock pulse generator 36 to only one terminal SR or SL in any one operation.

Information is entered into the register by means of an input winding 38 in the core $C_{2A}$, and an input winding 40 on the core $C_{4A}$. Also shown are alternate input windings 42 and 44 on the cores $C_{1B}$ and $C_{3B}$, respectively. Information may then be entered into the register by means of input windings 38 and 40, or alternately 42 and 44. Outputs may be taken from the register by connection of utilization means 46 and 46' across the first and last diode E in the register as shown.

The shift windings 30 on each of the cores $C_A$ and $C_B$ are adapted, when energized from the clock pulse source 36, to switch the cores $C_A$ and $C_B$ to negative saturation in the 0 state. Referring to the FIG. 4, a plot of flux density B versus applied field H is shown of the type material employed in each of the cores $C_A$ and $C_B$. As may be seen, the loop of FIG. 4 defines an idealized hysteresis characteristic, having well defined knees "*c*" and "*f*" for switching threshold with two remanent states, labelled 0 and 1, of magnetic flux density.

Referring to the FIGS. 3 and 4, the bias winding 28 on each core $C_A$ and $C_B$ is energized by the source 32 to bias the cores $C_A$ and $C_B$ in negative saturation, as indicated by an arrow labelled bias in the FIG. 4. As stated above, energization of the shift windings 30 on any core $C_A$ or $C_B$ provides enough field to drive the core into the 0 state.

Each of the diodes E is provided with a load characteristic as shown by the load line 12 in the FIG. 1, having two stable operating states P and Q.

Initially, assume all the diodes E are in the stable operating state P with the cores $C_A$ and $C_B$ in the lower or negative saturation state 0. If an impulse is directed into the undotted end of the winding 38 on the core $C_{2A}$, the core $C_{2A}$ starts switching from 0 toward the 1 stable state causing a voltage to be induced on the control winding 25 of the core $C_{2A}$ with the undotted end positive. This induced voltage provides a voltage to the diode $E_2$ which causes increased current flow therethrough to thereby move the operation of $E_2$ from the stable operating state P to the point R. This jump then provides a greater voltage drop across $E_2$ causing the operating point of $E_2$ to seek the stable state Q. Immediately upon switching of the diode $E_2$ from the low voltage state P to the high voltage state R, a greater amount of current is caused to flow through the dotted end of the winding 25 on the core $C_{1A}$ and the undotted end of the winding 26 on the core $C_{1B}$, through the resistor $R_2$, the dotted end of the winding 26 on the core $C_{2B}$ and the undotted end of the winding 25 on the core $C_{2A}$. Thus, when the diode $E_2$ assumes the stable operating state Q, the cores $C_{1B}$ and $C_{2A}$ are left in the positive saturation, while the remaining cores are left in negative saturation. Thus, receipt of information to the register has left all the diodes E in the stable state P except the diode $E_2$ which is in the stable state Q. This operational state provides current through the windings 25 and 26 on the cores $C_{1A}$ and $C_{1B}$, through the resistor $R_1$ and the windings 26 and 25 on the cores $C_{2B}$ and $C_{2A}$. This current is directed into the dotted end of winding 25 on the core $C_{1A}$ and the winding 26 on the core $C_{2B}$, while directed into the undotted end of windings 26 and 25 on the cores $C_{1B}$ and $C_{2A}$. The cores $C_{1B}$ and $C_{2A}$ are switched from the 0 to the 1 state since this current is great enough to provide an applied field overcoming the bias field, as is shown in the FIG. 4 by an arrow labelled "shunt field."

As an alternate means of inserting information into the register of FIG. 3, assume, initially, that all the diodes E are in the P stable state and all the cores $C_A$ and $C_B$ are in negative saturation, and an impulse is directed into the undotted end of the winding 42 on the core $C_{1B}$. This impulse causes the core $C_{1B}$ to start switching from negative toward positive saturation, inducing a voltage on its control winding 26 with the undotted end positive. This induced voltage dictates less current flow through the parallel circuit in which it is located. The diode $E_2$ in order to allow increased current moves from its operating point P, up the curve 10 and switches to point R. The operation of the circuit is now similar to that described above with information entered via the input winding 38 on the core $C_{2A}$. Thus information is entered into the register of FIG. 3 by means of the input windings 38 or 42 on alternate cores $C_A$ and $C_B$, respectively.

Assuming information is to be shifted to the right, the switch 34 is operated to connect the clock source 36 to the terminal SR. Only the shift winding 30 on the cores $C_A$ are energized to switch the cores $C_A$ to negative saturation when the clock source 36 is actuated. Upon energization of the winding 30 on the core $C_{2A}$ by the clock source 36, the core $C_{2A}$ is switched from positive toward negative saturation and in doing so induces a voltage on its control winding 25 with the dotted end positive, causing a decreased voltage drop across the diode $E_2$ and an increased voltage drop across the diode $E_3$. The diode $E_2$ then switches from its operating point Q to the point S on the curve 10 of the FIG. 1, while the diode $E_3$ switches from point P to point R. The diodes $E_2$ and $E_3$ then start toward their stable operating states P and Q, respectively, causing increased current flow through the dotted end of the winding 25 on the core $C_{2A}$, the undotted end of the winding 26 on the core $C_{2B}$, through the resistor $R_3$, the dotted end of the winding 26 on the core $C_{3B}$ and the undotted end of the winding 25 on the core $C_{3A}$. As this transition takes place, a smaller voltage drop, and thus a smaller current flow, is experienced in the circuit including the control windings 25 and 26 on the cores $C_{1A}$ and $C_{1B}$, respectively. Thus, the core $C_{1B}$ is reset to negative saturation by the bias field applied by the bias winding 28 energized by the source 32, and the cores $C_{2B}$ and $C_{3A}$ are switched to positive saturation with all the diodes E left in the P stable state except the diode $E_3$ which is left in the Q stable state.

If the information retained in the register is now to be shifted to the left, the switch 34 is operated to connect the clock pulse source 36 to the terminal SL. Only the shift winding 30 on the cores $C_B$ are energized by the source 36 to switch the cores $C_B$ to negative saturation. The core $C_{2B}$ now starts switching from positive to negative saturation, and thereby induces a voltage on its control winding 26 with the dotted end positive. Since a voltage balance must exist in the parallel circuits, the diode $E_2$ has a greater positive voltage applied thereto while the diode $E_3$ has a negative voltage applied. The diode $E_2$ then switches from operating state P to point R, while the diode $E_3$ switches from operating state Q to point S, on the curve 10 of the FIG. 1. As the diodes $E_2$ and $E_3$ then seek their stable operating conditions Q and P, respectively, increased current flows through the dotted end of the winding 25 on the core $C_{1A}$, the undotted end of the winding 26 on the core $C_{1B}$, through the resistor $R_2$, the dotted end of the winding 26 on the core $C_{2B}$ and the undotted end of the winding 25 on the core $C_{2A}$. During this transition period, the bias applied to the core $C_{3A}$ by means of the source 32 energizing the winding 28 thereon, starts resetting the core $C_{3B}$ toward negative saturation. In this manner, the cores $C_{1B}$ and $C_{2A}$ are switched to positive saturation due to the shunt field, with the diode $E_2$ left in the Q stable operating state and the diode $E_3$ left in the P stable operating state, while the core $C_{3A}$ is reset to negative saturation by the bias field applied as set forth above.

Since the diodes E are caused to operate in two stable states, they are utilized as the memory elements and the cores $C_A$ and $C_B$ need only be made of saturable reactor type material but, as shown above, work equally well with material exhibiting a rectangular hysteresis characteristic.

It has been demonstrated how the registers of FIGS. 2 and 3 may be constructed and operated to receive information and shift this information in one direction, as shown in the circuit of FIG. 2, or in either direction as shown in the circuit of FIG. 3. A utilization means 24 is shown in the embodiment of FIG. 2 connected across the diode $E_4$ as one possible means by which information retained in the register may be read out and employed. The register of FIG. 2 may be continuously energized by the clock source 24 to continuously shift the information retained therein to the right. Each time the diode $E_4$ switches from one operating stable state to another, an output, indicative of information, is obtained due to the difference in voltage drop. If, instead of a continuous voltage type output, a pulse type is desired, a capacitor serially connected in the line to the utilization means may be employed. Further, since the mode of operation of the circuit of FIG. 2, i.e. with the diodes operating in two stable states or only one, may differ, an asymmetrical impedance device may also be employed to sensitize the utilization means to give polarity signals only.

In the embodiment of FIG. 3, a utilization means 46 is shown connected across the diode $E_1$ and a further utilization means 46′ is shown connected across the diode $E_4$. The separate utilization means shown may take the form of a single means or a plurality of means, but preferably is connected across the diode E at either end of the line for serial readout of the register, either left or right.

Although outputs from the registers are shown taken across the diodes E in the embodiments of FIGS. 2 and 3, it is obvious to those skilled in the art that further windings coupling the cores C will work equally well for pulse type outputs.

While the invention has been particularly shown and described with reference to preferred embodiments thereof, it will be understood by those skilled in the art that various changes in form and details may be made therein without departing from the spirit and scope of the invention.

What is claimed is:

1. An information reversible shift register comprising, a current source, a plurality of tunnel diodes adapted to be operated in a first and a second stable state, means connecting said diodes head to tail in series with said source, a plurality of circuits each connected to a terminal intermediate said diodes and coupling a first and a second magnetic core, a plurality of winding means on each said core including a shift right winding for each of said first cores and a shift left winding for each of said second cores, said diodes normally operated in said first stable state whereby said cores are held in a datum saturation condition and adapted to operate in said second stable state to represent said information whereupon the first core of one of said circuits and the second core of another of said circuits is caused to be oppositely saturated, and means for selectively energizing the shift right and shift left windings to establish the associated cores in said datum saturation condition so that the diode operated in said second stable state is caused to assume said first stable state and another of said diodes is caused to assume said second stable state.

2. The register of claim 1, wherein each of said circuit couples the first and second cores thereof in opposing relationship.

3. The register of claim 2, wherein winding means includes a bias winding on each said core adapted to bias the cores of said register toward said datum condition of saturation.

4. The register of claim 1, wherein said cores are capable of attaining different stable states of residual magnetization.

5. A shift register comprising, a current source, a plurality of tunnel diodes, a like plurality of bistable magnetic cores coupled to a corresponding diode, a plurality of windings on each said cores, a number of said cores adapted to be switched to an information representative stable state by energization of one winding of said plurality of windings, and means including another winding of said plurality of windings for establishing said cores in a datum stable state.

6. A shift register comprising, a current source, a plurality of tunnel diodes connected head to tail with said source, a bistable magnetic core associated with each said diode, a plurality of windings including a control winding on each of said cores, circuit means connecting the control winding on each of said cores in parallel with the associated diode, a number of said cores adapted to be switched to an information representative stable state upon energization of another winding of said plurality of windings, and means for establishing said cores in a datum stable state.

7. The register of claim 6, wherein each said diode is adapted to operate in a stable state characterized by high current and a low voltage.

8. The register of claim 6, wherein each said diode is adapted to operate in a stable state characterized by a low current and a high voltage.

9. The register of claim 6, wherein each said diode is adapted to operate in a first and a second stable state.

10. An information shift register comprising, a current source, a plurality of tunnel diodes connected head to tail with said source, said diodes adapted to be operated in a first and a second stable state, a magnetic core associated with each said diode, a plurality of windings including a control winding on each said core, circuit means connecting the control winding on said cores in parallel with the associated diode, means including another winding of said plurality of windings on said cores for establishing a number of said diodes in said second stable state in representing said information, and means for establishing said diodes in said first stable state.

11. In a circuit, a current source, a tunnel diode connected to said source and adapted to be operated in a first and a second stable state, a bistable magnetic core, means for switching said core from one to another stable state, and means coupling said core to said diode for interdependently relating the stable states of said core and said diode.

12. In a circuit, a current source, a tunnel diode connected to said source adapted to be operated in a first and a second stable state, a bistable magnetic core, winding means on said core, means including a first and a second winding of said winding means for switching said core from one to another stable state, and means including a further winding of said winding means coupling said core to said diode for interdependently relating the stable states of said core and said diode.

13. In a circuit, a current source, a tunnel diode connected with said source and adapted to be operated in a first and a second stable state, a bistable magnetic core, a plurality of windings on said core including a control winding, said core adapted to be switched from one to another stable state upon energization of said windings, and circuit means connecting the control winding of said core in parallel with said diode for interdependently relating the stable states of said core and said diode.

14. In a circuit, a current source, a tunnel diode connected to said source and adapted to be operated in a first and a second stable state, first and second bistable magnetic cores, means for switching one of said cores from one to another stable state, and means coupling said cores to said diode for interdependently relating the stable states of said cores and said diodes.

15. In a circuit, a current source, a tunnel diode, having two separate positive resistance regions in its voltage-current characteristic, connected to said source, a bistable magnetic core, a plurality of windings including a control winding on said core, different ones of said plurality of windings adapted to be energized and initiate switching of said core alternately from one to another of said stable states, and means connecting said control winding with said diode to cause said diode to switch from one positive resistance region in its voltage-current characteristic to the other positive resistance region, responsive to the energization of said different windings on said core, to completely switch said core to the stable state initiated by the energization of said different windings.

16. The circuit of claim 15 wherein said control winding is connected in parallel with said diode.

17. The circuit of claim 15 wherein said diode is adapted to operate in a stable state characterized by a high current and low voltage.

18. The circuit of claim 15 wherein said diode is adapted to operate in a stable state characterized by a low current and high voltage.

19. The circuit of claim 15 wherein said diode is adapted to operate in a first stable state characterized by a high current and low voltage and a second stable state characterized by a relatively low current and high voltage.

20. In a circuit, a current source, a tunnel diode, having two separate positive resistance regions in its voltage-current characteristic, connected to said source, first and second bistable magnetic cores, field applying means coupled to said first core for initiating switching of said first core from a first to a second stable state, and means coupling said cores to said diode to cause said diode to switch from one positive resistance region in its voltage-current characteristic to the other positive resistance region, responsive to said field applying means, to completely switch said first core and establish said second core in a stable state corresponding to the former stable state of said first core.

21. In a circuit, a current source, a tunnel diode, having two separate positive resistance regions in its voltage-current characteristic, connected to said source, first and second bistable magnetic cores, a plurality of windings including a control winding on each said core, one winding of said plurality of windings on said first core adapted to be energized and initiate switching of said first core from a first to a second stable state, and means connecting the control winding on both said cores to said diode to cause said diode to switch from one positive resistance region in its voltage-current characteristic to the other positive resistance region, responsive to the energization of said first core to said second stable state, and establish said second core in said first stable state.

22. The circuit of claim 21 wherein said control windings are connected in parallel with said diode.

23. The circuit of claim 21 wherein said diode is adapted to operate in a stable state characterized by a high current and a low voltage.

24. The circuit of claim 21 wherein said diode is adapted to operate in a stable state characterized by a low current and a high voltage.

25. The circuit of claim 21 wherein said diode is adapted to operate in a first and a second stable state.

26. In a circuit, a current source, first and second tunnel diodes connected head to tail with said source, said diodes adapted to be operated in a first and a second stable state, a bistable magnetic core, means for switching said core from one to another stable state, and means coupling said core to said diodes for interdependently relating the stable states of said diodes and said core.

27. In a circuit, a current source, first and second tunnel diodes connected head to tail with said source, said diodes adapted to be operated in a first and a second stable state, a bistable magnetic core, winding means including a control winding on said core, said core adapted to be switched from one stable state to another upon energization of a winding of said winding means, and means connecting the control winding on said core in parallel with said diodes for interdependently relating the stable states of said diodes and said core.

28. In a circuit a current source, a tunnel diode, said source connected to said diode for biasing said diode to operate in a first and a second stable state, a magnetic core saturable in both a first and a second direction of flux orientation, and means intercoupling said diode and said magnetic core for interdependently relating the state of said diode and the direction of saturation of said magnetic core.

References Cited in the file of this patent

UNITED STATES PATENTS

| | | |
|---|---|---|
| 2,785,390 | Rajchman | Mar. 12, 1957 |
| 2,911,626 | Jones et al. | Nov. 3, 1959 |